(12) United States Patent
Hsu et al.

(10) Patent No.: US 11,260,509 B2
(45) Date of Patent: Mar. 1, 2022

(54) TORSIONAL STRAIN SENSING DEVICE AND POWER TOOL HAVING THE SAME

(71) Applicant: Techway Industrial Co., Ltd., Taichung (TW)

(72) Inventors: Chih-Hua Hsu, Taichung (TW); Wei-Ming Chen, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 505 days.

(21) Appl. No.: 16/430,590

(22) Filed: Jun. 4, 2019

(65) Prior Publication Data
US 2019/0381640 A1 Dec. 19, 2019

(30) Foreign Application Priority Data
Jun. 14, 2018 (TW) .................................. 107120559

(51) Int. Cl.
| | | |
|---|---|---|
| *B25B 23/147* | (2006.01) | |
| *B25F 5/00* | (2006.01) | |
| *B25B 21/00* | (2006.01) | |
| *G01L 3/10* | (2006.01) | |

(52) U.S. Cl.
CPC ............ *B25B 23/147* (2013.01); *B25B 21/00* (2013.01); *B25F 5/001* (2013.01); *G01L 3/108* (2013.01)

(58) Field of Classification Search
CPC ....... B25B 23/147; B25B 21/00; B25F 5/001; G01L 3/108
See application file for complete search history.

(56) References Cited

U.S. PATENT DOCUMENTS

| | | | |
|---|---|---|---|
| 10,357,871 B2* | 7/2019 | Thorson | B25B 23/141 |
| 10,987,793 B2* | 4/2021 | Bixler | B25F 5/001 |
| 11,067,460 B2* | 7/2021 | Venzal | G01B 7/30 |

FOREIGN PATENT DOCUMENTS

CN 102239031 11/2011

* cited by examiner

*Primary Examiner* — David B. Thomas
(74) *Attorney, Agent, or Firm* — Burris Law, PLLC

(57) ABSTRACT

A torsional strain sensing device comprises a cylindrical hub and a frame. The frame surrounds the cylindrical hub and includes a first sidewall, an opposite second sidewall, a first connecting wall extended between the first sidewall and the second wall at one end, and a second connecting wall extended between the first sidewall and the second sidewall at the opposite end. The first sidewall has a first flat lateral outer surface, and the second sidewall has a second flat lateral outer surface. The first and second lateral outer surfaces are adapted for attachment of strain sensors thereon. A first cavity and a second cavity oppositely defined between the cylindrical hub and the frame.

12 Claims, 14 Drawing Sheets

TORSIONAL STRAIN SENSING DEVICE AND POWER TOOL HAVING THE SAME

CROSS-REFERENCE TO RELATED APPLICATION

This application claims priority of Taiwanese Patent Application No. 107120559, filed on Jun. 14, 2018.

FIELD

The disclosure relates to a hand tool, more particularly, to a power tool with a torsional strain sensing device.

BACKGROUND

In order to maintain high-precision construction equipment under the circumstances of using a power tool as well as making a trial run, there is a need to monitor or to sense the torque the power tool is subjected to. The torque sensed can be used to measure the applied torsional force and to make good use of the tool. For example, a disc-shaped torque transducer disclosed in Chinese Patent No. CN102239031 is used with a power tool for measuring the output torque of the power tool. The power tool includes a motor, a drive train operably connected to and driven by the motor, a drive collar engaged with the drive train, a housing at least partially surrounding the motor and the drive train, a reference disk fixedly coupled to the housing, and the strain transducer. The strain transducer as disclosed in this prior art is disc-shaped, is positioned between the drive collar and the reference disk, and has a hub connected to the reference disk, a rim connected with the drive collar, and a web extended between the hub and the rim. A strain gauge positioned on the web measures the torque or strain on the torque transducer when the power tool is operated. However, the web is of a ring shape, and is inconvenient to apply the commercially available strain gauge. Besides, the web is located in a recessed surface surrounded by the rim, this adds difficulties in bonding the strain gauge to the conventional strain transducer.

SUMMARY

Therefore, the object of the disclosure is to provide a torsional strain sensing device which facilitates utilization convenience while with enhanced detection accuracy.

Another object of the present disclosure is to provide a power tool with the inventive torsional strain sensing device.

According to the disclosure, a torsional strain sensing device includes a cylindrical hub and a frame. The cylindrical hub includes a surrounding wall that is annular around a central axis and that defines an axial passage hole. The frame surrounds the cylindrical hub, and includes a first sidewall and a second sidewall connected respectively to opposite sides of the cylindrical hub. The first sidewall has a first end, an opposite second end, and a first flat lateral outer surface extended between the first and second ends and facing transversely to the central axis. The second sidewall has a third end, an opposite fourth end, and a second flat lateral outer surface extended between the third and fourth ends and facing transversely to the central axis. The frame further includes a first connecting wall extended between the first end and the third end, and a second connecting wall extended between the second end and the fourth end. The first connecting wall cooperates with the first and second sidewalls and the cylindrical hub to define a first cavity. The second connecting wall cooperates with the first and second sidewalls and the cylindrical hub to define a second cavity.

According to the disclosure, the power tool includes a motor assembly, a torque sensing assembly, a power output assembly, and a housing.

The motor assembly includes a main body, a splined drive shaft rotatable about a first axis, and a motor bracket fixed to the main body. The motor bracket has a cylindrical protrusion surrounding the first axis, extended along the first axis away from the main body of the motor assembly, and defining an aperture for passing through the splined drive shaft of the motor assembly.

The torque sensing assembly includes the abovementioned torsional strain sensing device and a plurality of strain sensors fixed on the first flat lateral outer surface and second flat lateral outer surface of the frame of the torsional strain sensing device. The cylindrical hub of the torsional strain sensing device is fixedly coupled to the cylindrical protrusion of the motor bracket such that the central axis is collinear with the first axis.

The power output assembly includes an annulus gear, a planet gear set, and an output shaft. The annulus gear is coupled to the side of the torsional strain sensing device, and has a gear rim with transmission teeth on an inside surface thereof. The planet gear set is disposed within the annulus gear, is meshed with the transmission teeth of the annulus gear, and orbits around and is meshed with the splined drive shaft of the motor assembly. The output shaft includes a driven end connected to and driven rotatably by the planet gear set, and an output end adapted to hold a tool bit.

The housing surrounds and holds the motor assembly, the torque sensing assembly, and the power output assembly.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
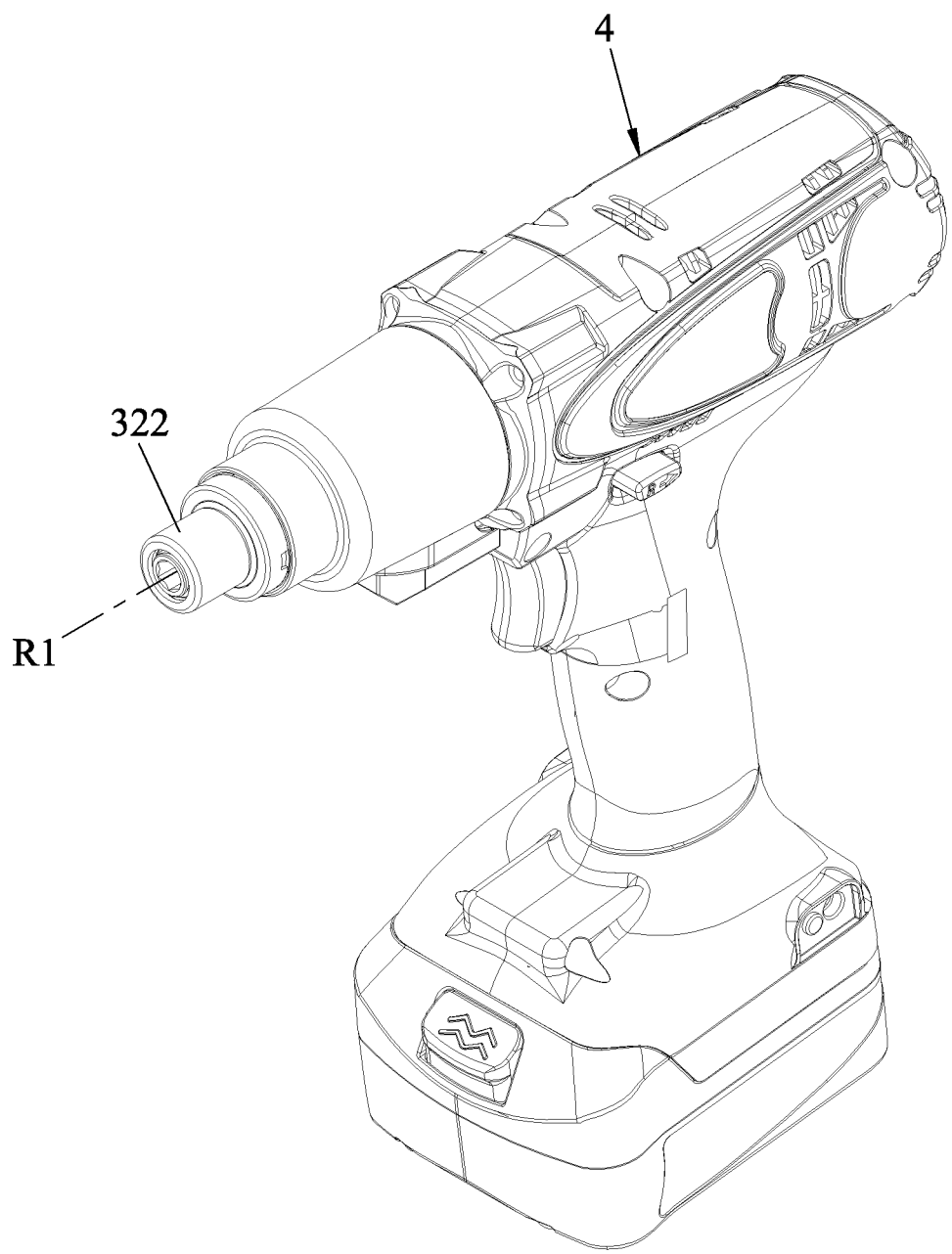
FIG. 1 is a perspective view of a power tool of the present disclosure.

Before the present disclosure is described in greater detail, it should be noted that where considered appropriate, reference numerals have been repeated among the figures to indicate corresponding or analogous elements, which may optionally have similar characteristics.

Figure 2:
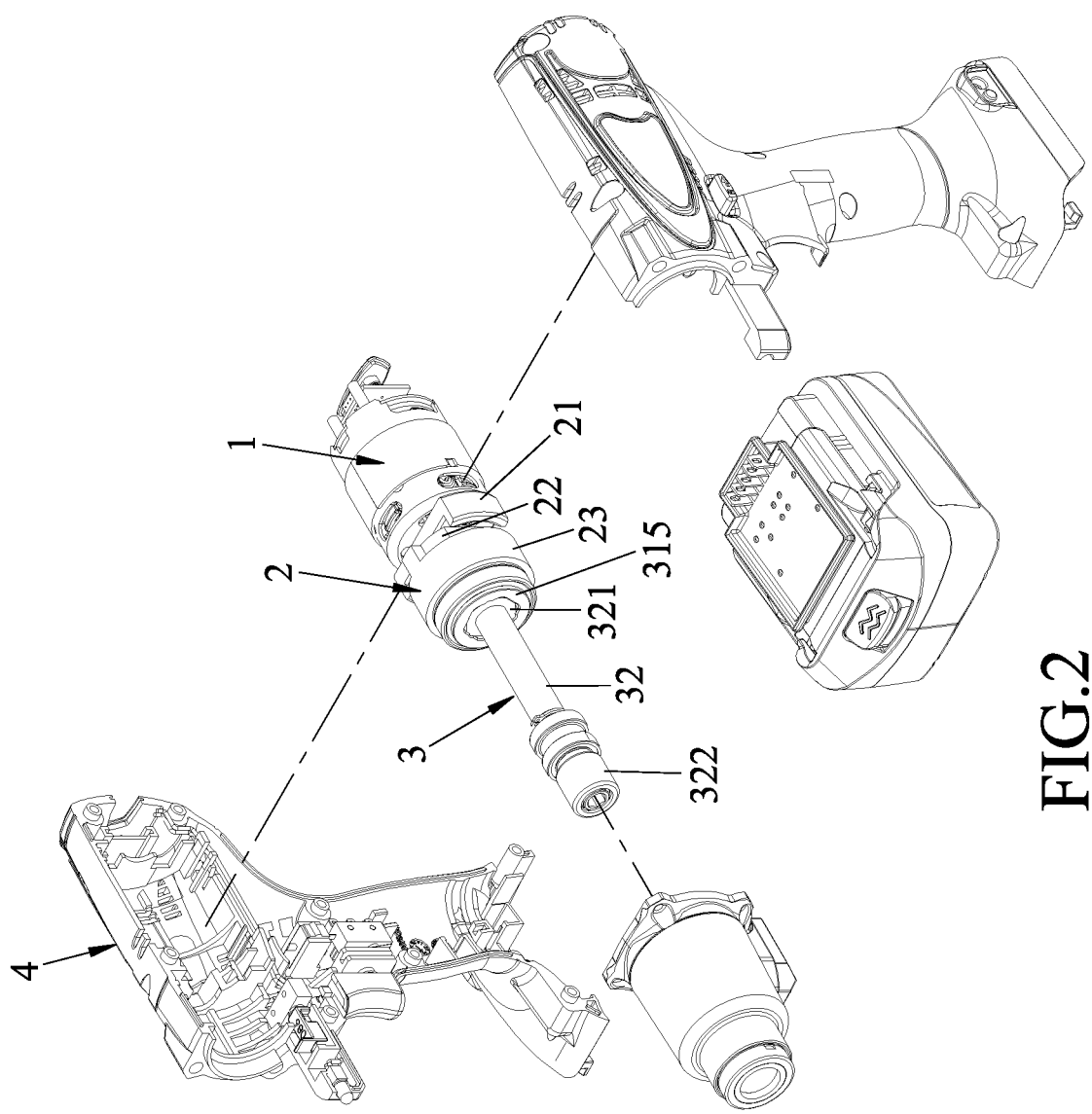
FIG. 2 is a partial exploded perspective view of a first embodiment of the power tool.

As shown in FIGS. 1 and 2, the first embodiment of a power tool according to the present disclosure is used for purpose of, for example, tightening a fastener (not shown), which includes a motor assembly 1, a torque sensing assembly 2, a power output assembly 3 and a housing 4 surrounding and holding the motor assembly 1, the torque sensing assembly 2 and the power output assembly 3.

Figure 3:
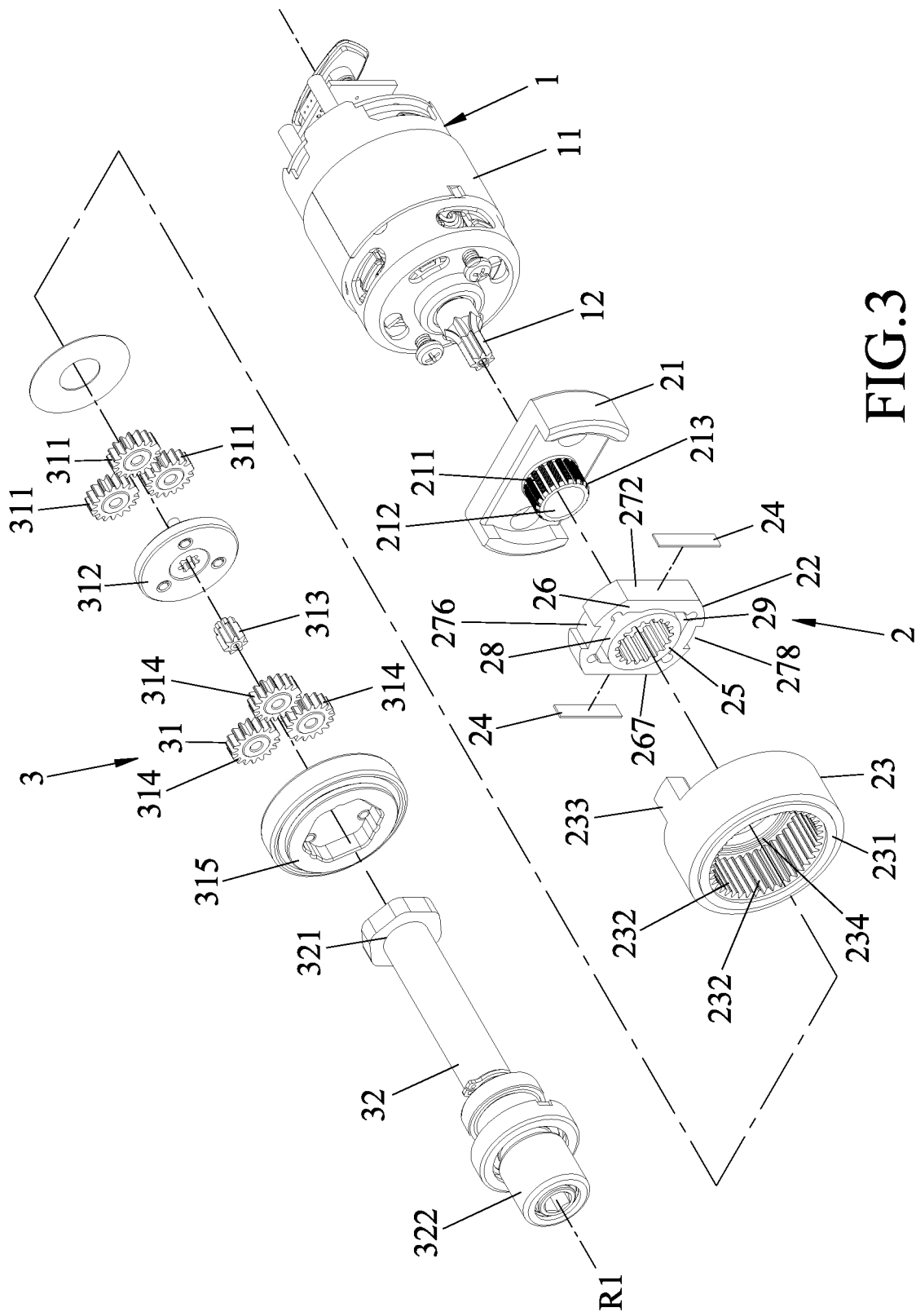
FIG. 3 is an exploded perspective view illustrating a motor assembly, a torque sensing assembly, and a power output assembly of the first embodiment of the power tool.
Figure 4:
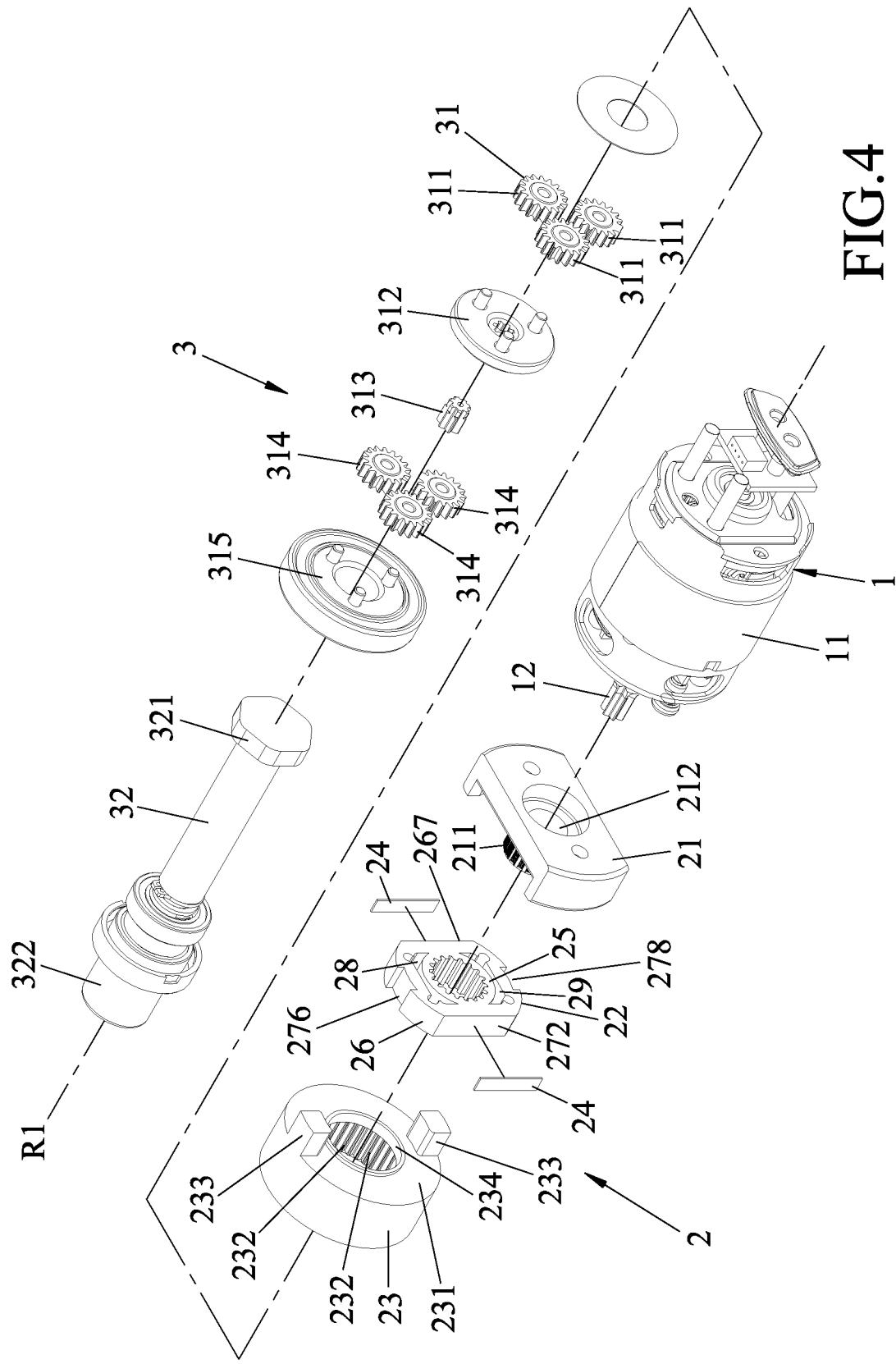
FIG. 4 is an exploded perspective view of the first embodiment from another angle of view.

Referring to FIGS. 3 and 4, the motor assembly 1 includes a main body 11, and a drive shaft 12 extending along a first axis (R1) and rotatable relative to the main body 11 about the first axis (R1). The motor assembly 1 further includes a motor bracket 21 fixed to the main body 11. The motor bracket 21 has a cylindrical protrusion 211 that surrounds the first axis (R1), that is extended along the first axis (R1) away from the main body 11, and that defines an aperture 212. The splined drive shaft 12 of the motor assembly 1 passes through the aperture 212.

The torque sensing assembly 2 includes a torsional strain sensing device 22 and a plurality of strain sensors 24 fixed thereto.

Figure 5:
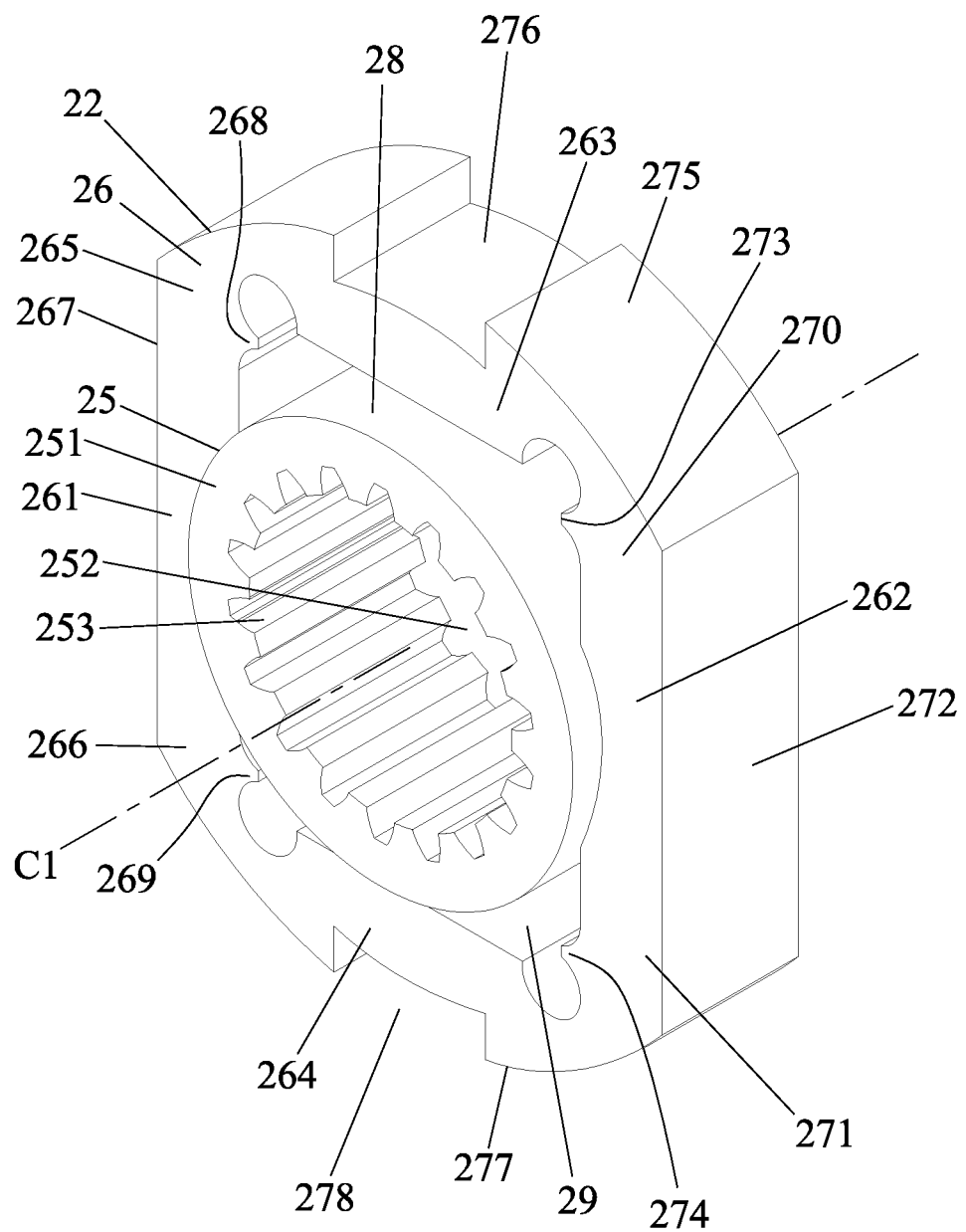
FIG. 5 is a perspective view of a torsional strain sensing device of the first embodiment.
Figure 6:
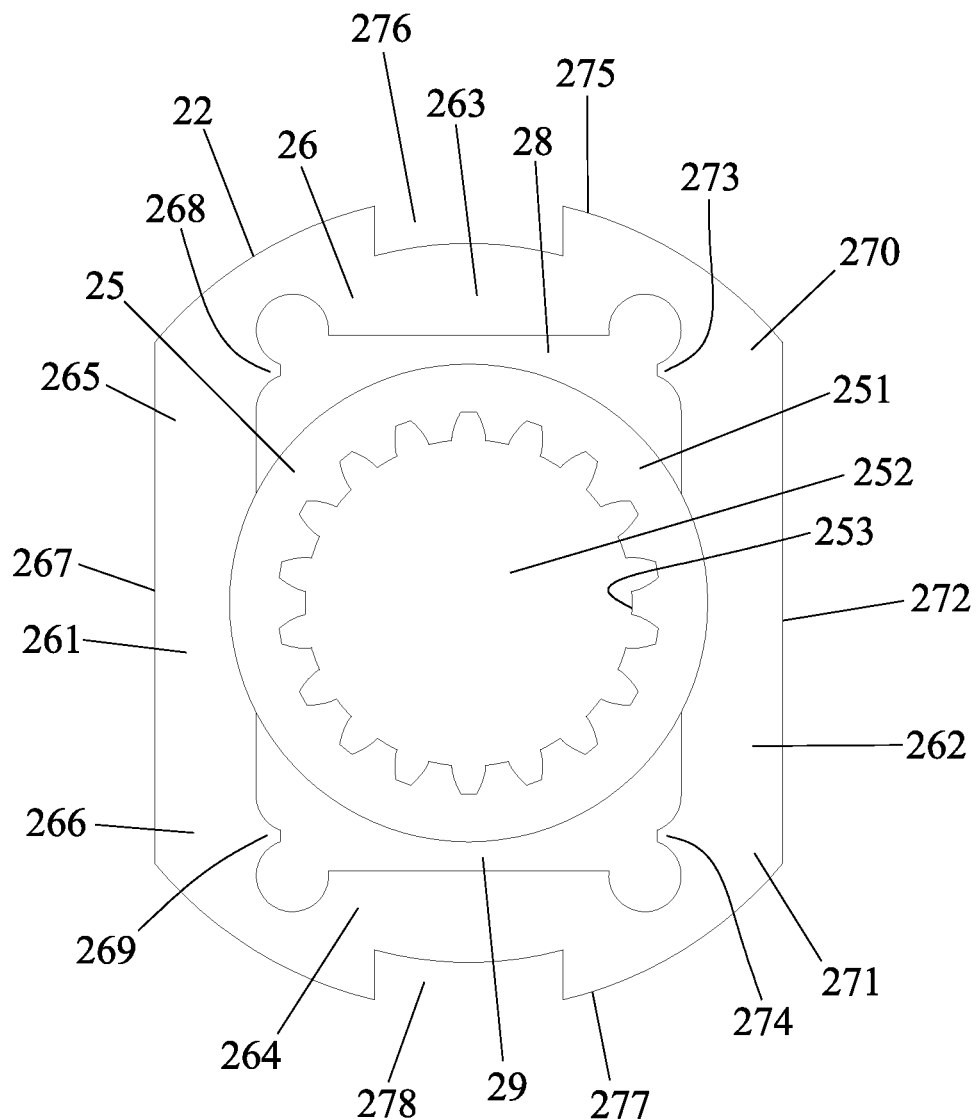
FIG. 6 is a front view of the torsional strain sensing device of the first embodiment.

Referring to FIGS. 3, 5 and 6, the torsional strain sensing device 22 includes a cylindrical hub 25 and a frame 26. The cylindrical hub 25 includes a surrounding wall 251 that is annular around a central axis (C1) and that defines an axial passage hole 252, and a splined inside surface 253 that is formed inside the surrounding wall 251 and that faces the axial passage hole 252. The frame 26 surrounds the cylindrical hub 25 and includes a first sidewall 261 connected to one side of the cylindrical hub 25, a second sidewall 262 connected to the opposite side of the cylindrical hub 25, a first connecting wall 263, and a second connecting wall 264.

The first sidewall 261 has a first end 265, an opposite second end 266, and a first flat lateral outer surface 267 extended between the first and second ends 265, 266 and facing transversely to the central axis (C1).

The second sidewall 262 has a third end 270, an opposite fourth end 271, and a second flat lateral outer surface 272 extended between the third and fourth ends 270, 271 and facing transversely to the central axis (C1).

The first connecting wall 263 is extended between the first end 265 of the first sidewall 261 and the third end 270 of the second sidewall 262, and that cooperates with the first and second sidewalls 261, 262 to define a first cavity 28 thereamong. The second connecting wall 264 is extended between the second end 266 of the first sidewall 261 and the fourth end 271 of the second sidewall 262, and that cooperates with the first and second sidewalls 261, 262 to define a second cavity 29 thereamong. The first sidewall 261 further has a first ridge 268 adjacent to the first cavity 28 and protruding toward the second sidewall 262, and a second ridge 269 adjacent to the second cavity 29, and protruding toward the second cavity 29. The second sidewall 262 further has a third ridge 273 adjacent to the first cavity 28 and protruding toward the second sidewall 262, and a fourth ridge 274 adjacent to the second cavity 29, and protruding toward the second cavity 29.

The inside corner of the first sidewall 261 and the first connecting wall 263 has a concave contour connected to an edge of the first ridge 268 to form a circular arc of 270 degrees. The inside corner of the first sidewall 261 and the second connecting wall 264 has a concave contour which is connected to an edge of the second ridge 269 to form a circular arc of 270 degrees.

The inside corner of the second sidewall 261 and the first connecting wall 263 has a concave contour which is connected to an edge of the third ridge 273 to form a circular arc of 270 degrees. The inside corner of the second sidewall 262 and the second connecting wall 264 has a concave contour which is connected to an edge of the first ridge 274 to form a circular arc of 270 degrees.

The first connecting wall 263 has a third outer surface 275 defining a first keyway 276. The second connecting wall 264 has a fourth outer surface 277 defining a second keyway 278.

Figure 7:
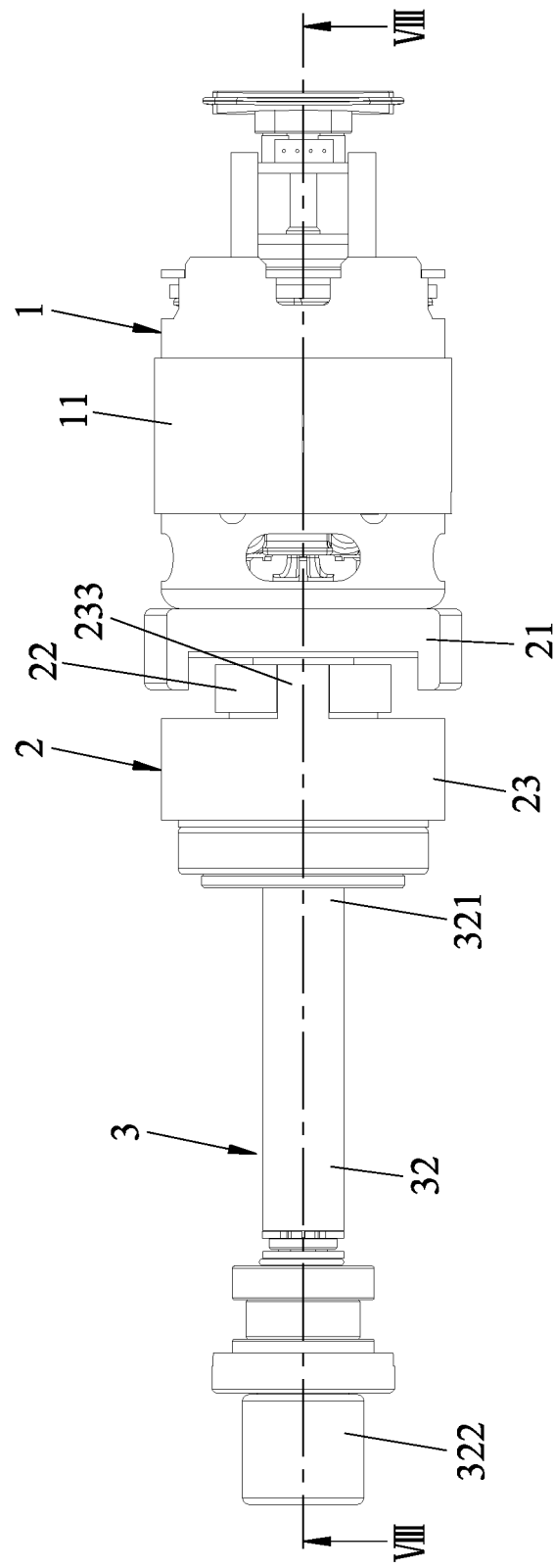
FIG. 7 is a top view illustrating the motor assembly, the torque sensing assembly, and the power output assembly of the first embodiment of the power tool.
Figure 8:
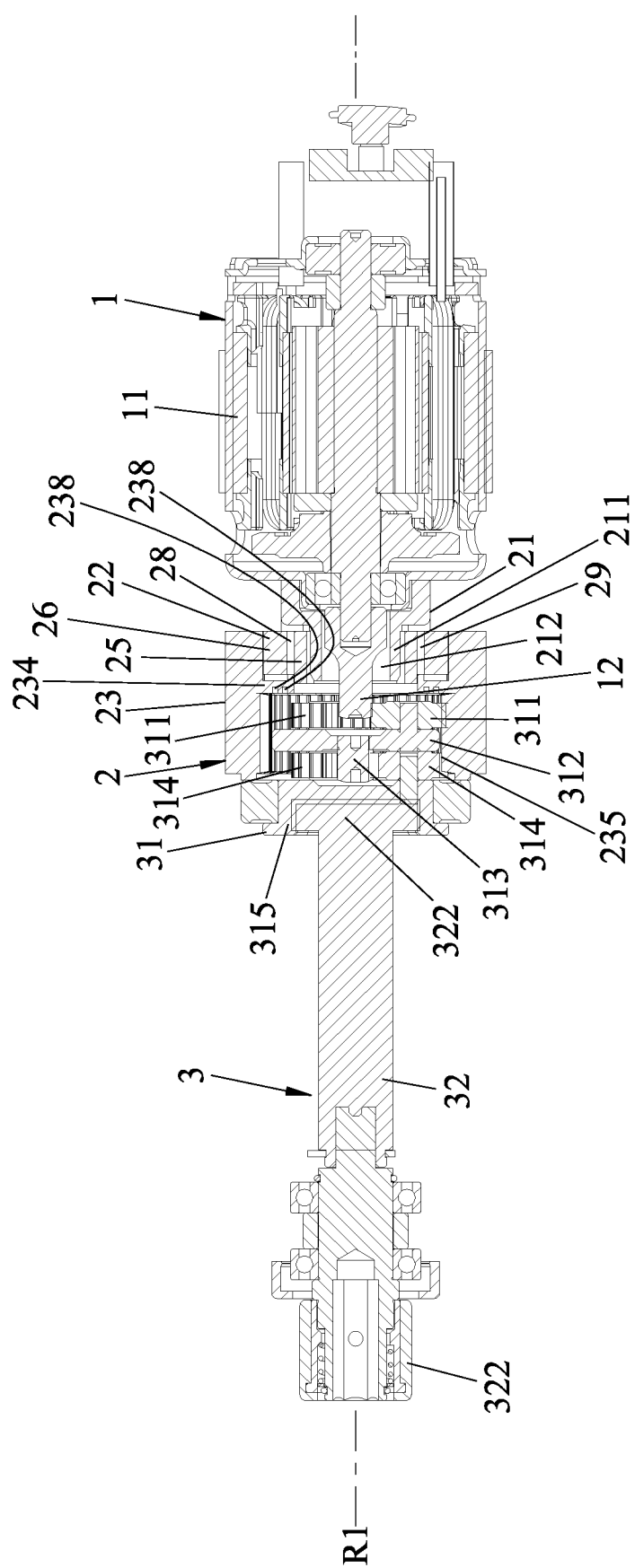
FIG. 8 is a cross-sectional view taken along line VIII-VIII of FIG. 7.

Referring to FIGS. 3, 7 and 8, the cylindrical protrusion 211 of the motor bracket 21 has a splined outer circumferential surface 213 which is opposite to the aperture 212. Referring further to FIGS. 5 and 8, the cylindrical protrusion 211 is fixedly coupled to the torsional strain sensing device 22 through the splined outer circumferential surface 213 engaging the splined inside surface 253 of the cylindrical hub 25, such that the central axis (C1) is collinear with the first axis (R1).

Figure 9:
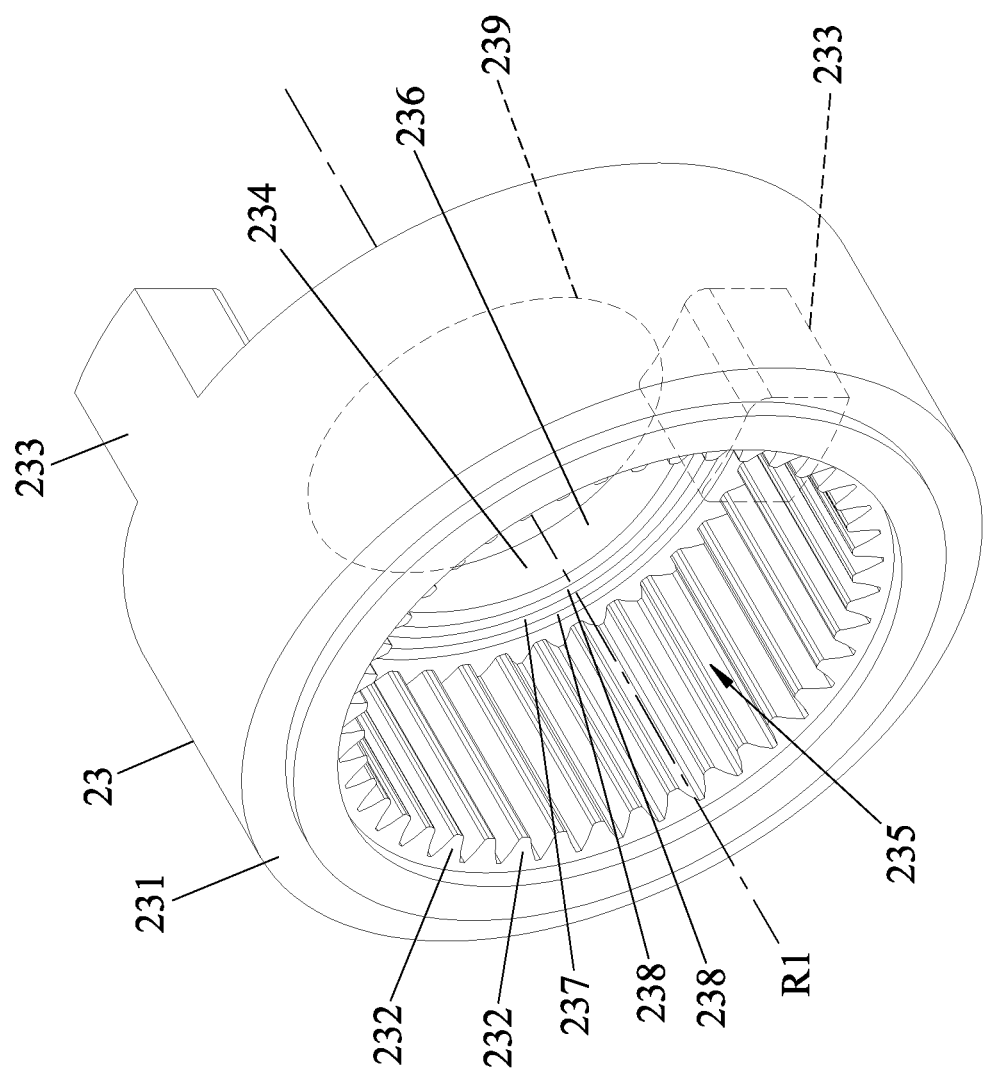
FIG. 9 is a perspective view of an annulus gear of the first embodiment.
Figure 10:
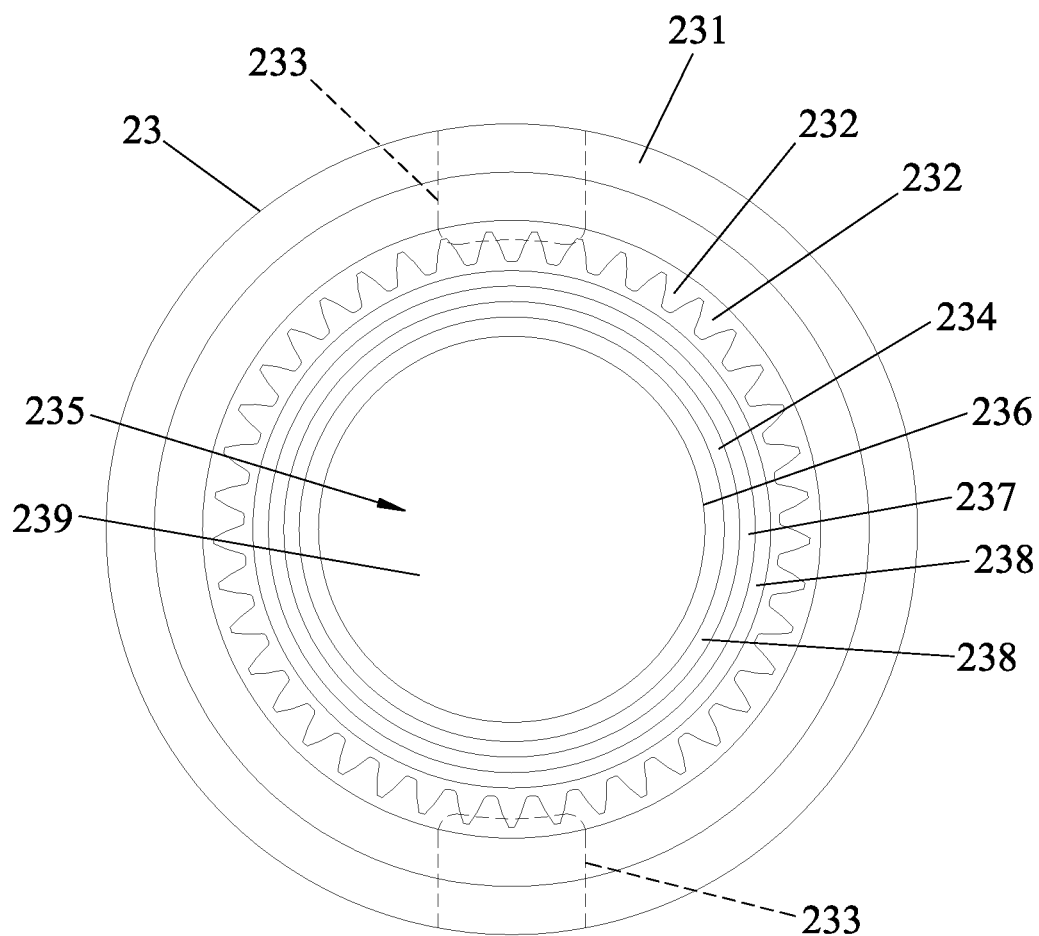
FIG. 10 is a front view of the annulus gear of the first embodiment.

Referring to FIG. 3, the power output assembly 3 includes an annulus gear 23, a planet gear set 31, and an output shaft 32. Referring further to FIGS. 4, 9 and 10, the annulus gear 23 is coupled to the side of the torsional strain sensing device 22 away from the motor bracket 21. The annulus gear 23 has a gear rim 231 with transmission teeth 232 on an inside surface thereof, a pair of diametrically-disposed tabs 233 protruding from the gear rim 231, and an internal bearing collar 234 protruding inwardly from the gear rim 231 and being adjacent to the torsional strain sensing device 22. The tabs 233 engage respectively the first keyway 276 and the second keyway 278 of the frame 26 of the torsional strain sensing device 22. The internal bearing collar 234 cooperates with the gear rim 231 to define a compartment 235. The collar 234 has a circumferential retaining surface 236 that faces the first axis (R1) and that defines a mounting hole 239 being in spatial communication with the compartment 235, an end surface 237 that is transverse to the circumferential retaining surface 236 and that faces the compartment 235, and two lubricant reservoirs 238 formed in the end surface 237. The cylindrical hub 25 of the torsional strain responsive device 22 is inserted fittingly into the mounting hole 239 and retained by the internal bearing collar 234. Through interlocking of the internal bearing collar 234 and the cylindrical hub 25, the concentricity of the torsional strain sensing device 22 with respect to transmission axis can be better ensured. In this embodiment, two of the lubricant reservoirs 238 are provided, but may be one or three or more in other embodiments.

Referring to FIGS. 3, 5 and 6, two strain sensors 24 are fixed on the first flat lateral outer surface 267 and the second flat lateral outer surface 272 respectively. It is also feasible that one or three or more of strain sensors 24 are applied. Moreover, the desired number of strain sensors 24 can be fixed to only one of the first flat lateral outer surface 267 and the second flat lateral outer surface 272, or fixed to both the first flat lateral outer surface 267 and the second flat lateral outer surface 272. Moreover, in this embodiment, the strain sensors 24 are of the commercially available type, but not limited to this.

Referring to FIGS. 3, 7 and 8, the planet gear set 31 is disposed within the compartment 235 of the annulus gear 23 and is coupled to the splined drive shaft 12.

The planet gear set 31 includes a plurality of first planet gears 311, a first planet carrier 312, an intermediate splined shaft 313, a plurality of second planet gears 314, and a second planet carrier 315. The plurality of first planet gears 311 orbit around the splined drive shaft 12 of the motor assembly 1, are meshed with the splined drive shaft 12 and the transmission teeth 232 of the annulus gear 23, and are rotatable relative to the annulus gear 23 and revolvable around the first axis (R1). The first planet carrier 312 is connected to the plurality of first planet gears 311 such that rotation of the first planet gears 311 drives the first planet carrier 312 to rotate about the first axis (R1). The intermediate splined shaft 313 is connected co-rotatably to the first planet carrier 312 and is extended along the first axis (R1). The plurality of second planet gears 314 orbit around the intermediate splined shaft 313, are meshed with the intermediate splined shaft 313 and the transmission teeth 232 of the annulus gear 23, and are rotatable relative to the annulus gear 23 and revolvable around the first axis (R1). The second planet carrier 315 is connected to the plurality of second planet gears 314 such that rotation of the second planet gears 314 drives the second planet carrier 315 to rotate about the first axis (R1). If lubricant is applied to the planetary gear set 31, the lubricant reservoirs 238 can contain excess lubricant to prevent it from flowing out of the compartment 235.

The output shaft 32 has a driven end 321 fixedly coupled to the second planet carrier 315 of the planet gear set 31, and an output end 322 adapted to hold a tool bit.

When the power tool is operated, the drive shaft 12 of the motor assembly 1 drives the plurality of the first planet gears 311 to rotate relative to the annulus gear 23 and revolve around the first axis (R1). The power is sequentially transmitted to the first planet carrier 312, the intermediate splined shaft 313, the plurality of the second planet gears 314, the second planet carrier 315, and finally to the output shaft 32. The output end 322 of the output shaft 32 is adapted to hold a tool bit through which a torque can be applied to a fastener intended to be tightened. In the process of tightening a fastener or upon finishing the tightening, the torsional strain sensing device 22 coupled with the motor bracket 21 and the annulus gear 23 is subjected to a torsional deformation, and the deformation can be detected by the strain sensors 24 fixed on the first and second flat lateral outer surfaces 267, 272 of the torsional strain sensing device 22, thereby the torque applied by the power tool can be ascertained.

It should be noted that, due to the accessibility of the first flat lateral outer surface 267 and the second flat lateral outer surface 272 of the torsional strain sensing device 22, it is convenient to fix the torque strain sensor 24 to the torsional strain sensing device 22. Moreover, it is not only convenient to apply a commercially available strain sensor 24, but also imparts a greater flexibility to formulate specifications when designing a strain sensor.

In addition, the configuration of the torsional strain sensing device 22 influences the sensitivity of detection. By virtue of the provision of the first cavity 28 and the second cavity 29, the area moment of inertia of the torsional strain sensing device 22 can be reduced and thus the torsional deformation thereof is increased, thereby enhancing the detection accuracy.

As illustrated in FIG. 6, at each of the four inside corners of the frame 26 of the torsional strain sensing device 22, a circular arc is formed. Such a configuration has been seen in strain gauge, planar flexure hinges, and load cell in the scales and the like, which permits increased torsional deformation and provides an enhanced detection accuracy.

Figure 11:
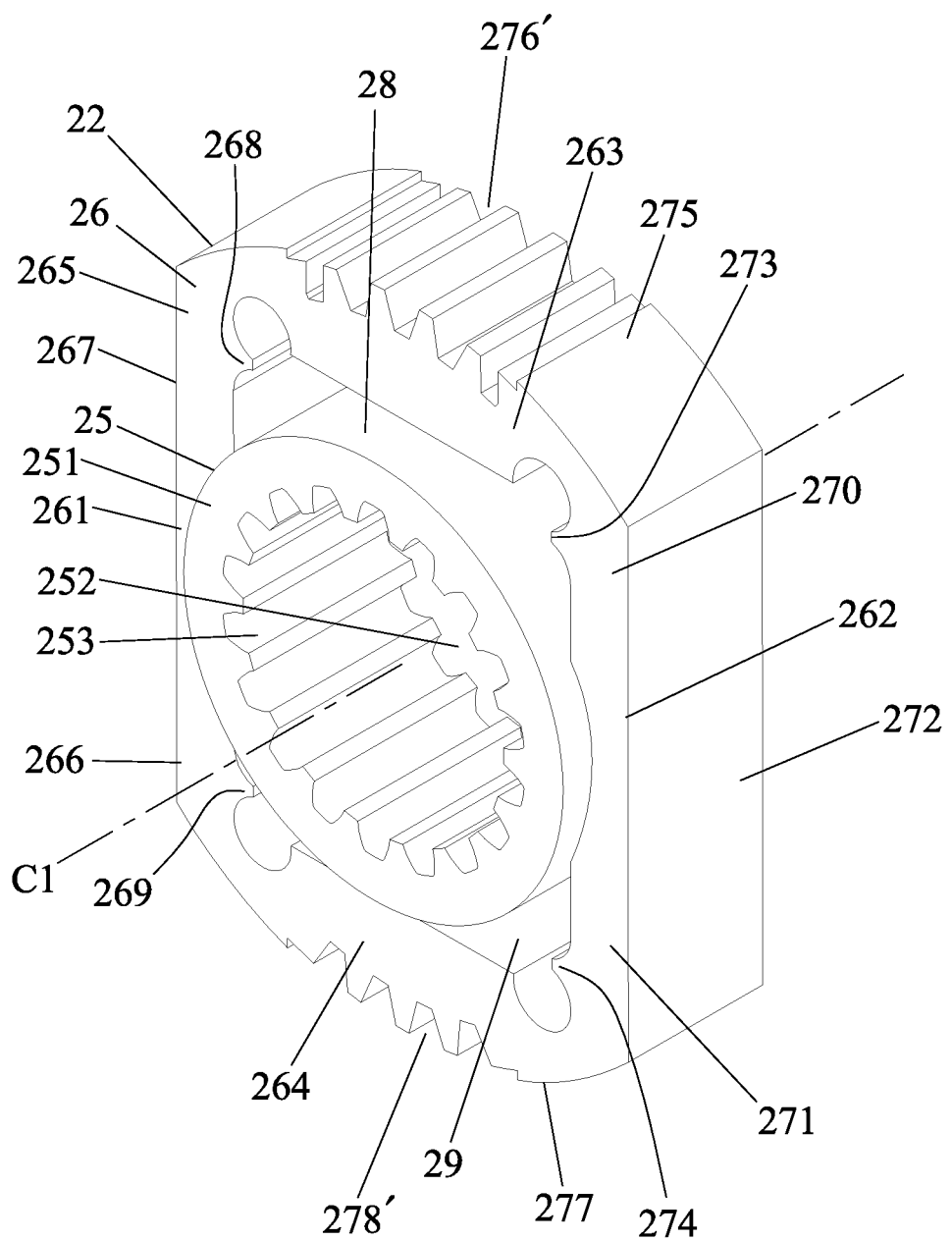
FIG. 11 is a perspective view of the torsional strain sensing device of a second embodiment of the power tool of the present disclosure.
Figure 12:
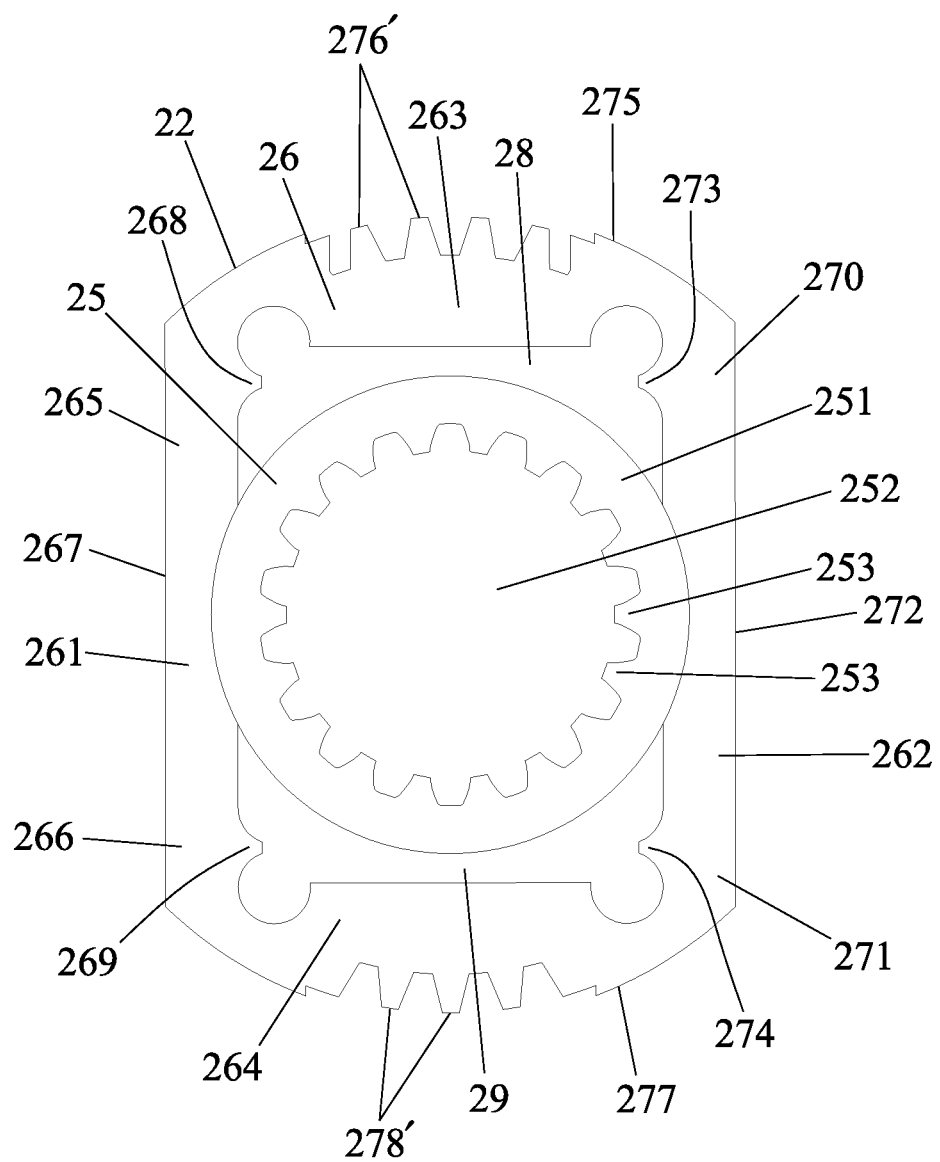
FIG. 12 is a front view of the torsional strain sensing device of the second embodiment.
Figure 13:
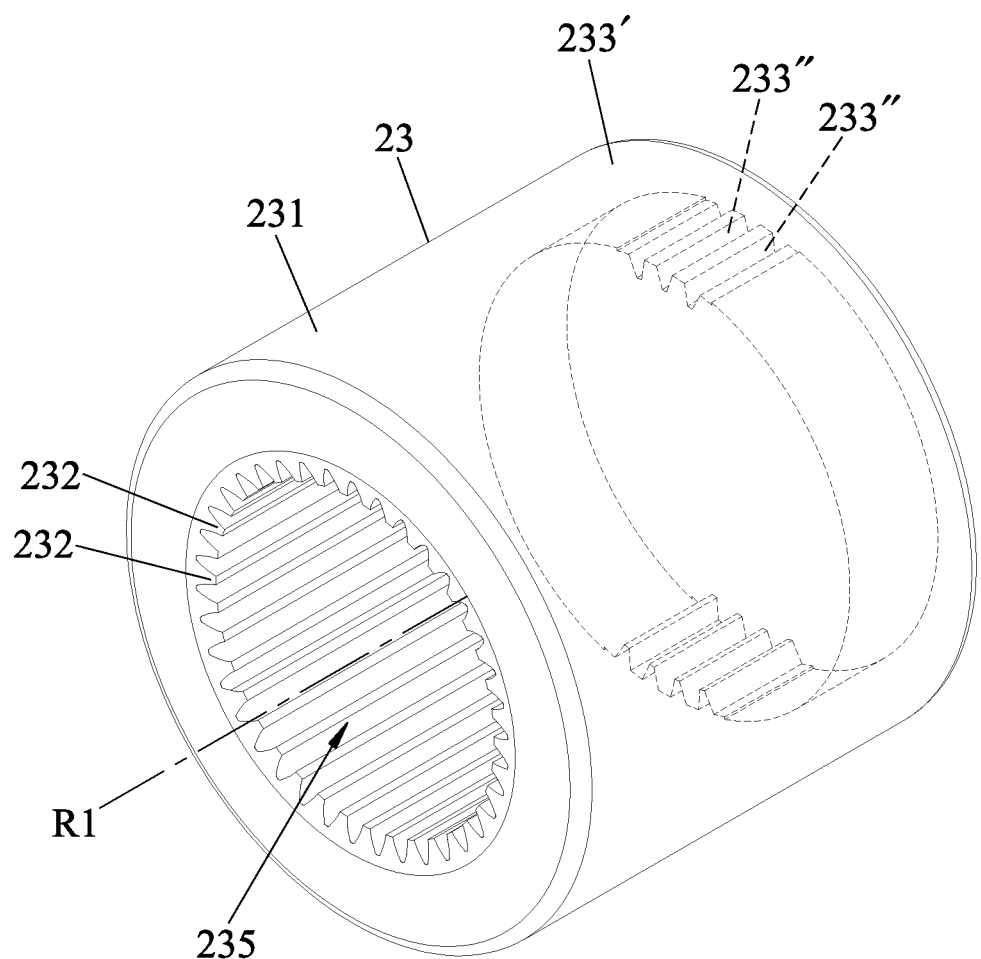
FIG. 13 is a perspective view of the annulus gear of the second embodiment.
Figure 14:
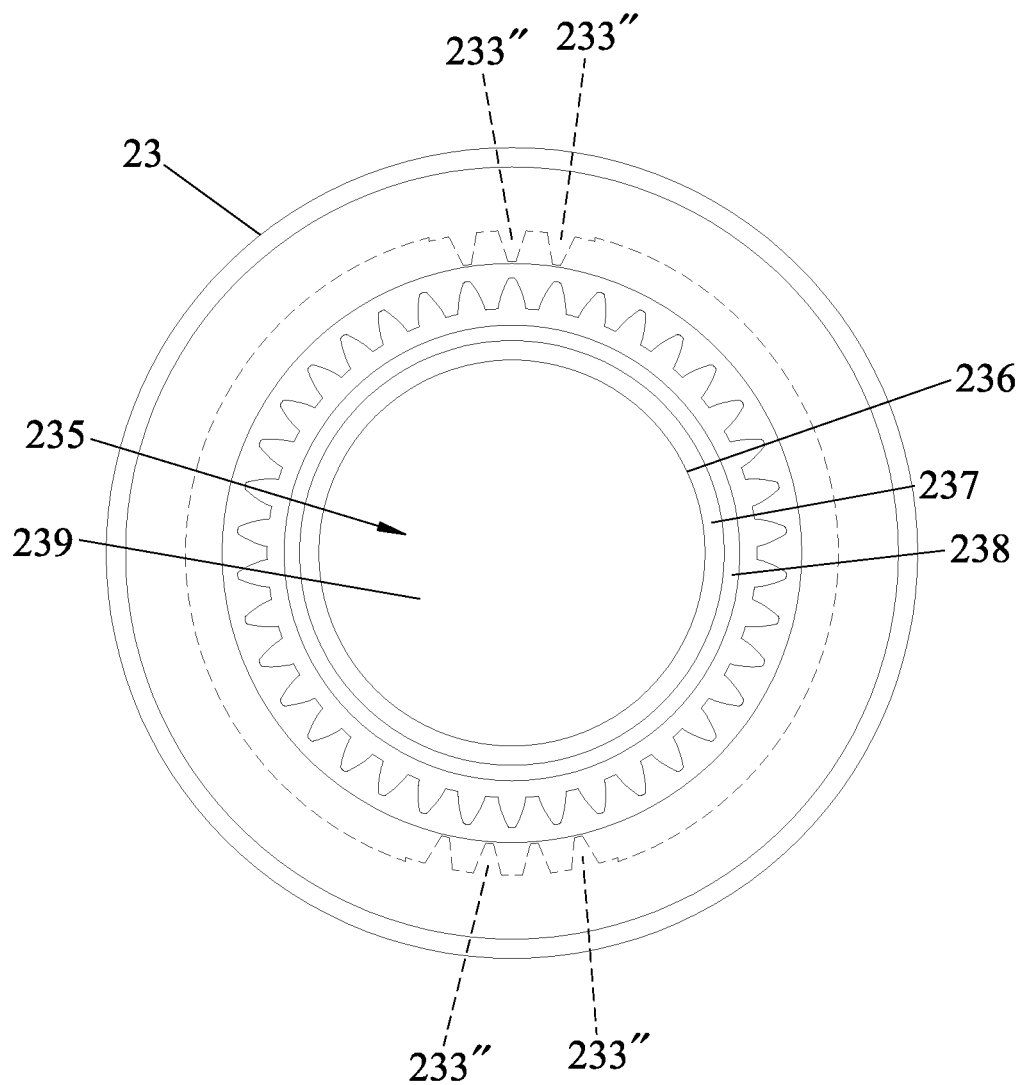
FIG. 14 is a rear view of the annulus gear of the second embodiment.

Referring to FIGS. 11, 12 and 13, the second embodiment of the present disclosure is similar to the first embodiment, and the difference lies in the coupling between the torsional strain sensing device 22 and the annulus gear 23. The third outer surface 275 of the first connecting wall 263 of the torsional strain sensing device 22 includes a plurality of first locking teeth 277', and the fourth outer surface 277 of the second connecting wall 264 of the torsional strain sensing device 22 includes a plurality of second locking teeth 278'. The annulus gear 23 has a coupling sleeve 233' having a plurality of third locking teeth 233" that are diametrically disposed on the inner circumferential surface of the annulus gear 23 and that engage with the first locking teeth 277' and the second locking teeth 278'.

In summary, the configuration of the torsional strain sensing device 22 of the present disclosure includes a first flat lateral outer surface 267 and a second flat lateral outer surface 272, which facilitates the assembly of the strain sensor 24 with the torsional strain sensing device 22. Moreover, the area moment of inertia of the torsional strain sensing device 22 can be reduced through the first cavity 28 and the second cavity 29, so that an increased torsional deformation is permitted when the torsional strain sensing device 22 is subjected to a torque and thus to improve the detection accuracy. As a result, the power tool with this torsional strain sensing device 22 has enhanced utility.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A torsional strain sensing device comprising:
   a cylindrical hub including a surrounding wall that is annular around a central axis and that defines an axial passage hole; and
   a frame surrounding said cylindrical hub, and including a first sidewall and a second sidewall that are connected respectively to opposite sides of said cylindrical hub, said first sidewall having a first end, an opposite second end, and a first flat lateral outer surface that is extended between said first and second ends and that faces transversely to the central axis, said second sidewall having a third end, an opposite fourth end, and a second flat lateral outer surface (272) that is extended between said third and fourth ends and that faces transversely to the central axis, a first connecting wall that is extended between said first end and said third end, and that cooperates with said first and second sidewalls and said cylindrical hub to define a first cavity thereamong, and a second connecting wall that is extended between said second end and said fourth end, and that cooperates with said first and second sidewalls and said cylindrical hub to define a second cavity thereamong.

2. The torsional strain sensing device as claimed in claim 1, wherein:

said first sidewall further has a first ridge adjacent to said first cavity and protruding towards said second sidewall, and a second ridge adjacent to said second cavity and protruding towards said second sidewall; and said second sidewall further has a third ridge adjacent to said first cavity and protruding towards said first sidewall, and a fourth ridge adjacent to said second cavity and protruding towards said first sidewall.

3. The torsional strain sensing device as claimed in claim 2, wherein:

the inside corner of said first sidewall and said first connecting wall has a concave contour connected to an edge of said first ridge to form a circular arc;

the inside corner of said first sidewall and said second connecting wall has a concave contour connected to an edge of said second ridge to form a circular arc;

the inside corner of said second sidewall and said first connecting wall has a concave contour connected to an edge of said third ridge to form a circular arc; and the inside corner of said second sidewall and said second connecting wall has a concave contour connected to an edge of said fourth ridge to form a circular arc.

4. The torsional strain sensing device as claimed in claim 2, wherein said cylindrical hub further includes a splined inside surface inside said surrounding wall and facing said axial passage hole.

5. The torsional strain sensing device as claimed in claim 2, wherein said first connecting wall includes a third outer surface defining a first keyway, and said second connecting wall includes a fourth outer surface defining a second keyway.

6. The torsional strain sensing device as claimed in claim 2, wherein said first connecting wall includes a third outer surface defining a plurality of first locking teeth, and said second connecting wall includes a fourth outer surface defining a plurality of second locking teeth.

7. A power tool comprising:

a motor assembly including a main body, a splined drive shaft that is rotatable relative to said main body about a first axis, and a motor bracket fixed to said main body, said motor bracket having a cylindrical protrusion that surrounds the first axis, that is extended along the first axis away from said main body of said motor assembly, and that defines an aperture for passage of said splined drive shaft of the motor assembly therethrough;

a torque sensing assembly including said torsional strain sensing device as claimed in claim 1, with said cylindrical hub thereof fixedly coupled to said cylindrical protrusion of said motor bracket such that the central axis is collinear with the first axis, and a plurality of strain sensors fixed on said first flat lateral outer surface and said second flat lateral outer surface of said frame of said torsional strain sensing device;

a power output assembly including an annulus gear that is coupled to said torsional strain sensing device, and that has a gear rim with transmission teeth on an inside surface thereof, a planet gear set that is disposed within said annulus gear, that is meshed with said transmission teeth of said annulus gear, and that orbits around and is meshed with said splined drive shaft of said motor assembly, and an output shaft that includes a driven end connected to and driven rotatably by said planet gear set, and an output end adapted to hold a tool bit; and a housing surrounding and holding said motor assembly, said torque sensing assembly, and said power output assembly.

8. The power tool as claimed in claim 7, wherein said planet gear set of said power output assembly includes:

a plurality of first planet gears that orbit around said splined drive shaft of said motor assembly, that are meshed with said splined drive shaft and said transmission teeth of said annulus gear, and that are rotatable relative to said annulus gear and revolvable around the first axis;

a first planet carrier that is connected to said plurality of first planet gears such that rotation of said first planet gears drives said first planet carrier to rotate about the first axis;

an intermediate splined shaft that is connected co-rotatably to said first planet carrier and that is extended along the first axis;

a plurality of second planet gears that orbit around said intermediate splined shaft, that are meshed with said intermediate splined shaft and said transmission teeth of said annulus gear, and that are rotatable relative to said annulus gear and revolvable around the first axis; and a second planet carrier that is connected to said plurality of second planet gears such that rotation of said second planet gears drives said second planet carrier to rotate about the first axis, said driven end of said output shaft being fixedly coupled to said second planet carrier.

9. The power tool as claimed in claim 7, wherein:

said first connecting wall of said frame of said torsional strain sensing device includes a third outer surface defining a first keyway, and said second connecting wall of said frame includes a fourth outer surface defining a second keyway; and said annulus gear of said power output assembly further has a pair of tabs engaging respectively said first keyway and said second keyway.

10. The power tool as claimed in claim 7, wherein:

said first connecting wall of said frame of said torsional strain sensing device includes a third outer surface defining a plurality of first locking teeth, and said second connecting wall of said frame includes a fourth outer surface defining a plurality of second locking teeth; and said annulus gear of said power output assembly further has a coupling sleeve having a plurality of third teeth that are diametrically disposed on an inner circumferential surface of said annulus gear and that engage said first locking teeth and said second locking teeth.

11. The power tool as claimed in claim 7, wherein:

said cylindrical hub of said torsional strain sensing device includes a splined inside surface inside said surrounding wall and facing said axial passage hole; and said cylindrical protrusion of said motor bracket has a splined outer circumferential surface engaging said splined inside surface of said cylindrical hub.

12. The power tool as claimed in claim 7, wherein:

said annulus gear further has an internal bearing collar protruding inwardly from said gear rim and being adjacent to said torsional strain sensing device, and cooperating with said gear rim to define a compartment accommodating said planet gear set;

said internal bearing collar has a circumferential retaining surface that faces the first axis and that defines a mounting hole being in spatial communication with said compartment, an end surface that is transverse to said circumferential retaining surface and that faces said compartment, and at least one lubricant reservoir that is formed in said end surface; and said cylindrical hub of said torsional strain sensing device being inserted fittingly into said mounting hole.

* * * * *